US012592980B2

(12) United States Patent
    Batra et al.

(10) Patent No.: US 12,592,980 B2
(45) Date of Patent: Mar. 31, 2026

(54) EFFICIENT BANDWIDTH SHARING FOR IoT DEVICES

(71) Applicant: Telit Communications S.p.A., Sgonico (IT)

(72) Inventors: Vishal Batra, Bangalore (IN); Sibasis Purohit, Bangalore (IN)

(73) Assignee: Telit Communications S.p.A., Sgonico (IT)

( * ) Notice: Subject to any disclaimer, the term of this patent is extended or adjusted under 35 U.S.C. 154(b) by 9 days.

(21) Appl. No.: 18/732,682

(22) Filed: Jun. 4, 2024

(65) Prior Publication Data

US 2024/0406249 A1 Dec. 5, 2024

(30) Foreign Application Priority Data

Jun. 3, 2023 (IN) .............................. 202311038868

(51) Int. Cl.
    H04L 67/06 (2022.01)
    H04L 67/12 (2022.01)
(52) U.S. Cl.
    CPC .............. H04L 67/06 (2013.01); H04L 67/12 (2013.01)
(58) Field of Classification Search
    None
    See application file for complete search history.

(56) References Cited

U.S. PATENT DOCUMENTS

| | | | |
|---|---|---|---|
| 2017/0034023 A1* | 2/2017 | Nickolov | ............ H04L 43/0817 |
| 2018/0316416 A1* | 11/2018 | Reis | ......................... H01Q 3/02 |
| 2020/0145480 A1* | 5/2020 | Sohail | ................ H04L 67/1095 |
| 2021/0157858 A1* | 5/2021 | Stevens | ................ G06F 40/237 |

OTHER PUBLICATIONS

Bradley et al., "Towards Characterizing IoT Software Update Practices", Sep. 20, 2022, ARXIV, Towards Characterizing IoT Software Update Practices. Foundations and Practice of Security. FPS 2022. Lecture Notes in Computer Science, vol. 13877. Springer, Cham. 406-422 (Year: 2022).*

* cited by examiner

*Primary Examiner* — Davoud A Zand
(74) *Attorney, Agent, or Firm* — PEARL COHEN ZEDEK LATZER BARATZ LLP

(57) ABSTRACT

Systems and methods for collaborative downloading between IoT devices include checking, by a first IoT device of a plurality of IoT devices connected to the same network, a server for an available data item; discovering, by the first IoT device, if one or more other IoT devices have downloaded or started downloading the data item; and, depending on the result of the discovery, the first IoT device requesting and receiving the data item from a second IoT device of one or more discovered IoT devices which have downloaded or are downloading the data item, or the first IoT device downloading the data item from the server, advertising, on the network that the first IoT device has downloaded the data item, and transmitting the data item to one of the other IoT devices.

20 Claims, 6 Drawing Sheets

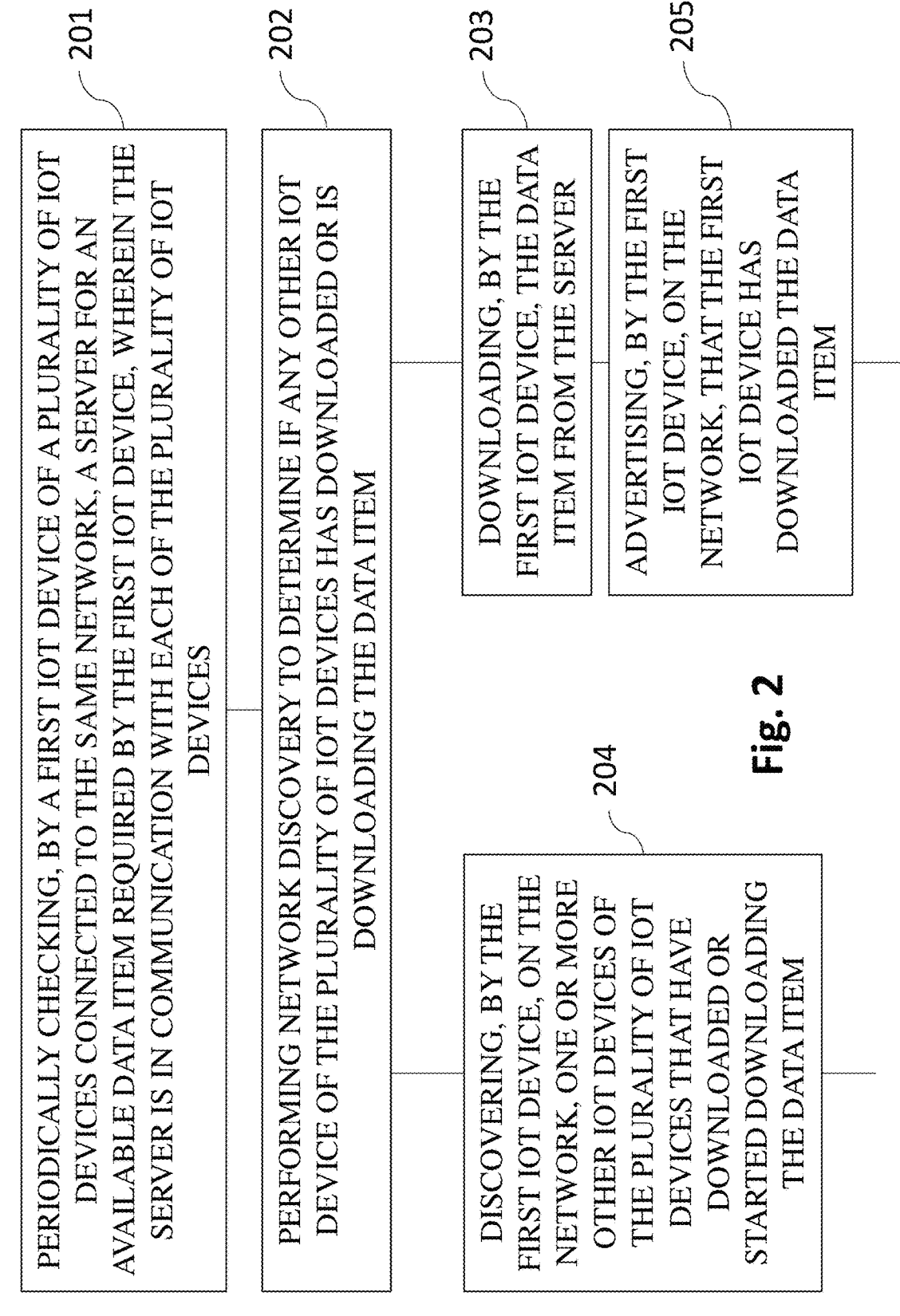

PERIODICALLY CHECKING, BY A FIRST IOT DEVICE OF A PLURALITY OF IOT DEVICES CONNECTED TO THE SAME NETWORK, A SERVER FOR AN AVAILABLE DATA ITEM REQUIRED BY THE FIRST IOT DEVICE, WHEREIN THE SERVER IS IN COMMUNICATION WITH EACH OF THE PLURALITY OF IOT DEVICES

201

PERFORMING NETWORK DISCOVERY TO DETERMINE IF ANY OTHER IOT DEVICE OF THE PLURALITY OF IOT DEVICES HAS DOWNLOADED OR IS DOWNLOADING THE DATA ITEM

202

DOWNLOADING, BY THE FIRST IOT DEVICE, THE DATA ITEM FROM THE SERVER

203

ADVERTISING, BY THE FIRST IOT DEVICE, ON THE NETWORK, THAT THE FIRST IOT DEVICE HAS DOWNLOADED THE DATA ITEM

205

DISCOVERING, BY THE FIRST IOT DEVICE, ON THE NETWORK, ONE OR MORE OTHER IOT DEVICES OF THE PLURALITY OF IOT DEVICES THAT HAVE DOWNLOADED OR STARTED DOWNLOADING THE DATA ITEM

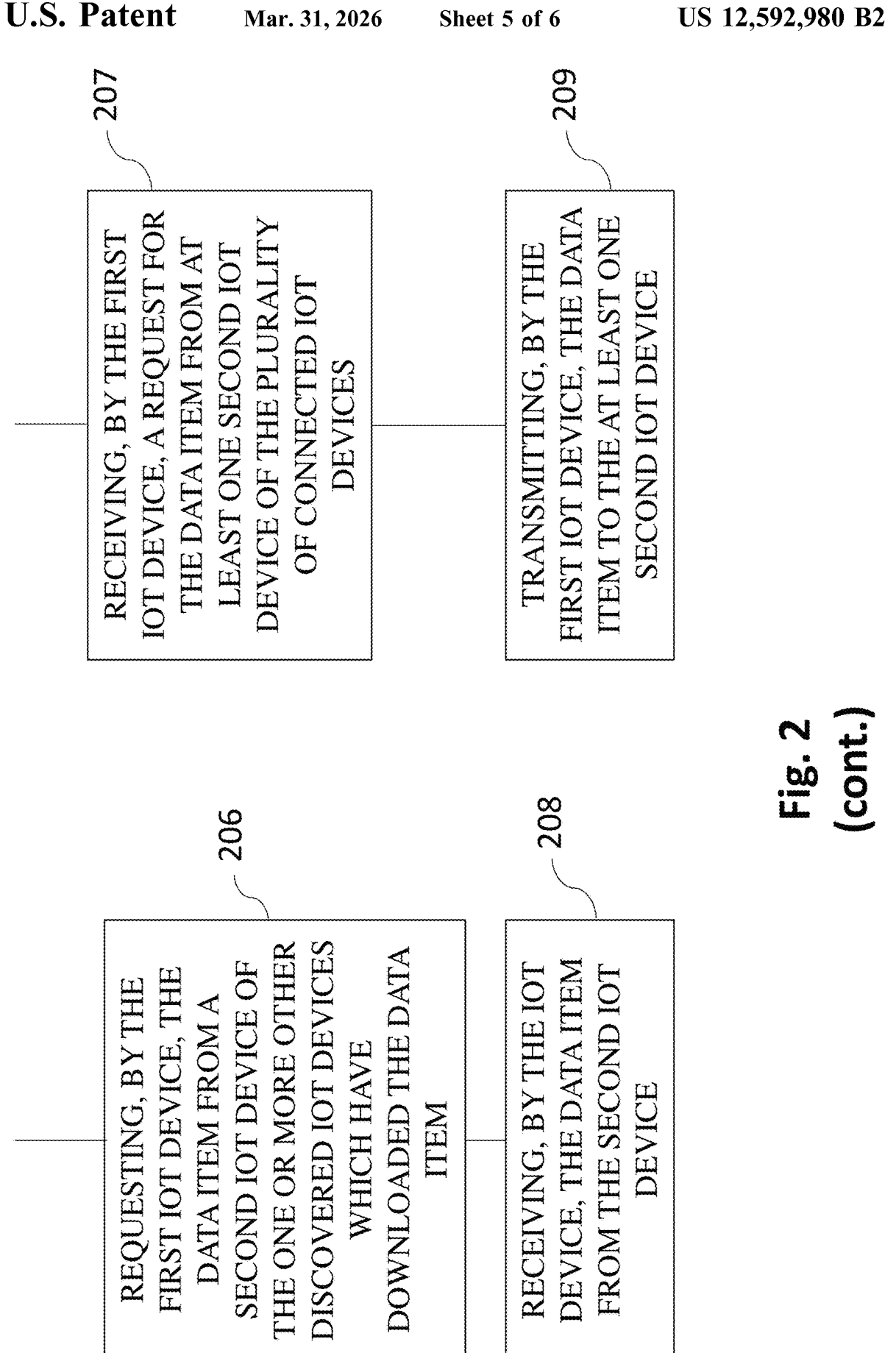

207

RECEIVING, BY THE FIRST IOT DEVICE, A REQUEST FOR THE DATA ITEM FROM AT LEAST ONE SECOND IOT DEVICE OF THE PLURALITY OF CONNECTED IOT DEVICES

209

TRANSMITTING, BY THE FIRST IOT DEVICE, THE DATA ITEM TO THE AT LEAST ONE SECOND IOT DEVICE

206

REQUESTING, BY THE FIRST IOT DEVICE, THE DATA ITEM FROM A SECOND IOT DEVICE OF THE ONE OR MORE OTHER DISCOVERED IOT DEVICES WHICH HAVE DOWNLOADED THE DATA ITEM

208

RECEIVING, BY THE IOT DEVICE, THE DATA ITEM FROM THE SECOND IOT DEVICE

Fig. 2
(cont.)

EFFICIENT BANDWIDTH SHARING FOR IoT DEVICES

CROSS REFERENCE TO RELATED APPLICATIONS

This application claims priority to Indian patent application No. 202311038868 filed on Jun. 6, 2023, which is hereby incorporated by reference in its entirety.

FIELD OF THE INVENTION

The present invention relates generally to the field of internet of things (IoT) devices, in particular to collaboration between IoT devices.

BACKGROUND OF THE INVENTION

The internet of things (IoT) is a network of connected so-called "smart" devices. IoT devices may include various sensors, measurement devices, transmitters, receivers etc.

Device management of IoT devices is typically done in a centralized manner from a cloud-based server. This may mean that IoT devices are required to communicate directly with the central server, which can typically be multiple network hops away. If there are multiple IoT devices in the same location or network, each may typically communicate with the central server independently, which may be inefficient. For example, for communications which require large bandwidth usage (e.g., larger than a few MBs) such as firmware over the air (FOTA) images for updating the IoT devices, if each IoT device downloads the image from the server independently, this may result in a decrease of battery power for each IoT device in the network.

One prior art solution is the use of a gateway, but this may result in the need for additional hardware to be installed and maintained, which may be impractical for large networks of multiple IoT devices which typically require multiple gateways.

SUMMARY OF THE INVENTION

According to some embodiments of the present invention, there is a provided a system including: a plurality of internet of things (IoT) devices, each IoT device connected to the same network; and a server configured to communicate with each IoT device of the plurality of IoT devices. At least a first IoT device of the plurality of IoT devices is configured to: periodically check the server for an available data item required by the first IoT device; perform a network discovery to determine if any of the other IoT devices of the plurality of IoT devices has downloaded the data item; if one or more other IoT devices of the plurality of IoT devices has downloaded the data item: request the data item from a second IoT device of the one or more other IoT devices that downloaded or are downloading the data item, and receive the data item from the second IoT device; or if the network discovery shows that none of the other one or more IoT devices of the plurality of IoT devices have downloaded the data item required by the first IoT device from the server: download the data item from the server, identify to the network that the data item has been downloaded and is offered for service, and transmit the data item to one or more other IoT devices of the plurality of IoT devices which request the data item.

According to some embodiments of the present invention, there is provided a method for collaborative downloading between IoT devices. The method includes periodically checking, by a first IoT device of a plurality of IoT devices connected to the same network, a server for an available data item required by the first IoT device. The server is in communication with each of the plurality of IoT devices.

In some embodiments of the present invention, the method further includes discovering, by the first IoT device, on the network, one or more other IoT devices of the plurality of IoT devices that have downloaded the data item; requesting, by the first IoT device, the data item from a second IoT device of the one or more other discovered IoT devices which have downloaded or is downloading the data item; and receiving, by the IoT device, the data item from the second IoT device.

In some embodiments of the present invention, the method further includes downloading, by the first IoT device, the data item from the server; advertising, by the first IoT device, on the network, that the first IoT device has downloaded the data item; receiving, by the first IoT device, a request for the data item from at least one second IoT device of the plurality of connected IoT devices; and transmitting, by the first IoT device, the data item to the at least one second IoT device.

According to some embodiments of the present invention, the data item includes at least one of: an update, a firmware image, or a policy.

According to some embodiments of the present invention, the first IoT device is configured to, if the network discovery shows that none of the other one or more IoT devices of the plurality of IoT devices have downloaded the data item and a battery level of the first IoT device is below a predefined threshold, defer downloading the data item from the server and wait for a different IoT device of the plurality of IoT devices to download and offer for service the data item.

According to some embodiments of the present invention, the first IoT device is configured to, if the first IoT device downloads the data item from the server, determine that the second IoT device is a trusted IoT device, and only transmit the data item to a trusted IoT device. The first IoT device may determine that the second IoT device is a trusted IoT device by determining that the second IoT device has the same original equipment manufacturer (OEM) as the first IoT device, or has a certificate issued by the same certificate issuing authority as the first IoT device. The first IoT device may be configured to, if the first IoT device discovered a second IoT device that has downloaded the data item, determine that that the second IoT device is a trusted IoT device before the first IoT device requests the data item from the second IoT device.

According to some embodiments of the present invention, the network is configured to allow for dynamically adding or removing one or more IoT devices from the network based on at least one of: a battery level; a trust level; or an installed update version number.

According to some embodiments of the present invention, the first IoT device is configured to, if the network discovery shows that none of the other one or more IoT devices of the plurality of IoT devices have downloaded the data item: download the data item from the server via a first communication protocol, and transmit the data item, via a second, different, communication protocol, to the one or more other IoT device of the plurality of IoT devices which request the data item.

According to some embodiments, the first IoT device is configured to, if the first IoT device discovered one or more other IoT devices of the plurality of IoT devices that have downloaded the data item, communicate with the server via a first communication protocol, and receive the data item from the second IoT device via a second, different, communication protocol.

According to some embodiments of the present invention, the network is a cellular network, a wireless local area network (WLAN), a wide area network (WAN), or a metropolitan area network (MAN).

According to some embodiments of the invention, for a second data item required by the first IoT device, the IoT device defers downloading the second data item from the server and waits for a different IoT device of the plurality of connected IoT devices to download and advertise the data item if a battery level of the first IoT device is below a predefined threshold.

According to some embodiments of the invention, the second IoT device has the same original equipment manufacturer (OEM) as the first IoT device, or the second IoT device has a certificate issued by the same certificate issuing authority as the first IoT device.

According to some embodiments of the invention, the first IoT device downloads the data item from the server via a first communication protocol, and transmits the data item to at least one other IoT device of the plurality of IoT devices which has requested the data item via a second, different, communication protocol.

BRIEF DESCRIPTION OF THE DRAWINGS

Non-limiting examples of embodiments of the disclosure are described below with reference to figures attached hereto. Dimensions of features shown in the figures are chosen for convenience and clarity of presentation and are not necessarily shown to scale. The subject matter regarded as the invention is particularly pointed out and distinctly claimed in the concluding portion of the specification. The invention, however, both as to organization and method of operation, together with objects, features, and advantages thereof, can be understood by reference to the following detailed description when read with the accompanied drawings. Embodiments are illustrated without limitation in the figures, in which like reference numerals may indicate corresponding, analogous, or similar elements, and in which:

Figure 1A:
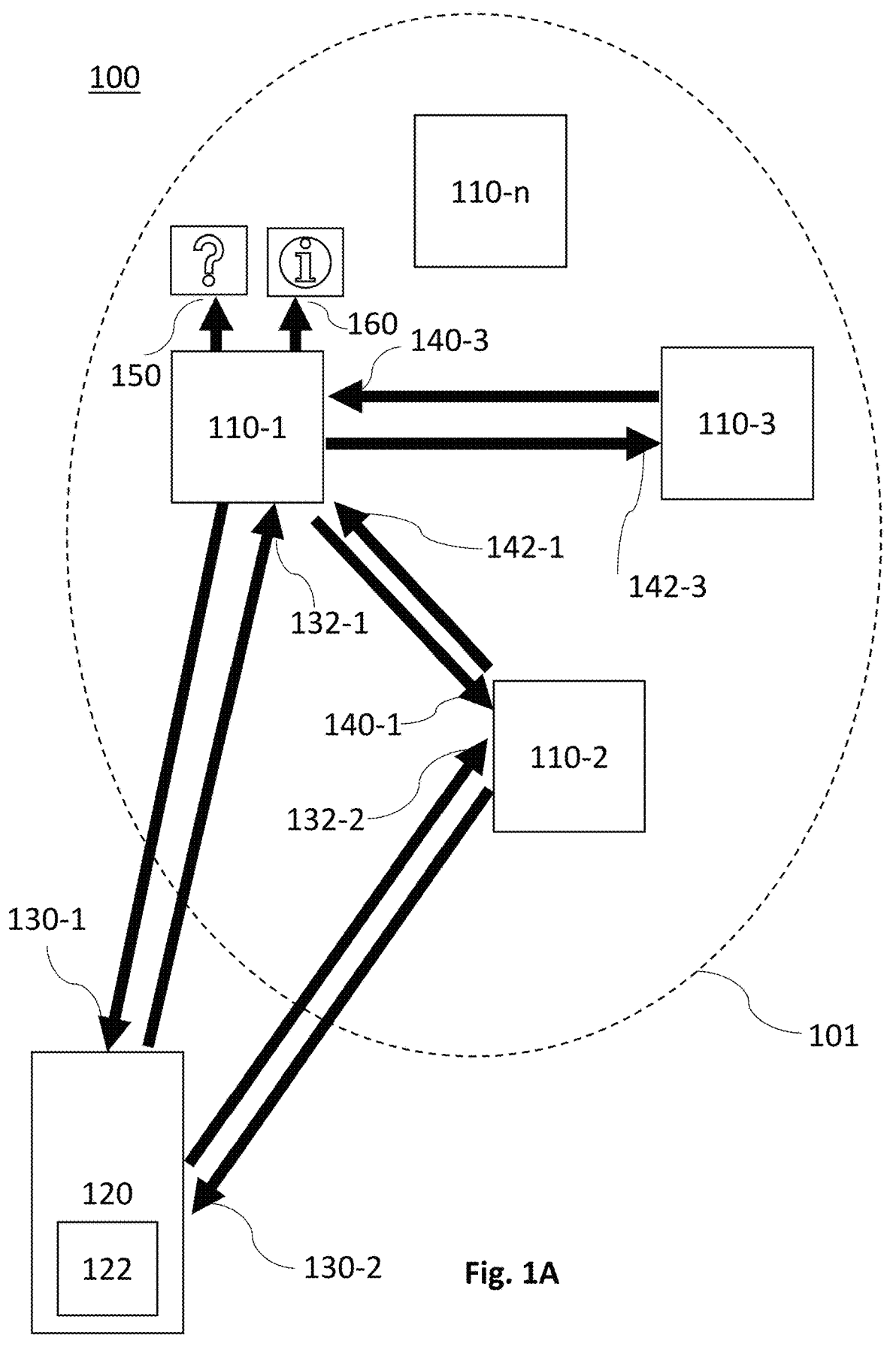

FIG. 1A is a schematic drawing of a system for collaborative downloading between IoT devices, according to some embodiments of the invention;

FIG. 2 is a flowchart of a method for collaborative downloading between IoT devices, according to some embodiments of the invention.

Figure 1B:
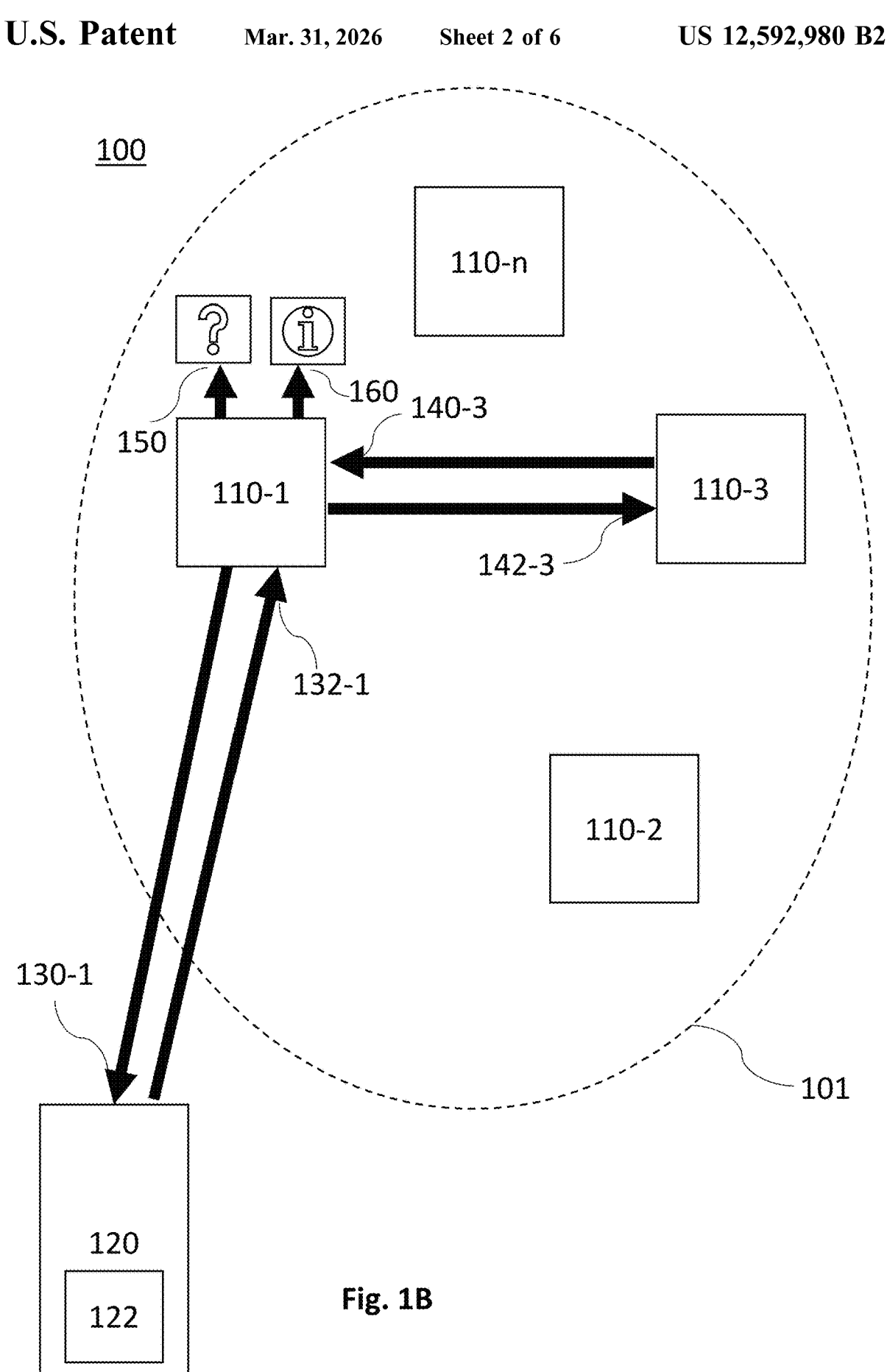
FIG. 1B is a schematic drawing of a system for collaborative downloading between IoT devices, showing an example subset of the operations from FIG. 1A, according to some embodiments of the invention.

It will be appreciated that for simplicity and clarity of illustration, elements shown in the figures have not necessarily been drawn accurately or to scale. For example, the dimensions of some of the elements can be exaggerated relative to other elements for clarity, or several physical components can be included in one functional block or element.

DETAILED DESCRIPTION

In the following detailed description, numerous specific details are set forth in order to provide a thorough understanding of the invention. However, it will be understood by those skilled in the art that the present invention can be practiced without these specific details. In other instances, well-known methods, procedures, components, modules, units and/or circuits have not been described in detail so as not to obscure the invention.

Most IoT devices have small batteries and so have associated battery power storage limitations. IoT devices may intermittently sleep or enter a power saving mode to avoid using battery power and conserve available battery resources. During a download of a data item required by an IoT device, such as an update (e.g., a firmware update, which is generally a firmware over the air (FOTA) image), the IoT device may be required to stay awake throughout the download, which may drain the battery, particularly for large file size downloads which take longer to download and/or downloads which require a lot of bandwidth. Updating many hundreds of IoT devices deployed in the field may be impractical to perform manually, and so IoT devices may receive an update by downloading from a central server.

Similar IoT devices or groups of same/similar IoT devices may require the same data, such as an update, but individual downloads by each IoT device from the central server may be inefficient. For example, the server may be many network hops away, which may increase a total time required for each download and accordingly increase battery usage. In addition, if multiple IoT devices in the group attempt to download from the server at the same time this can tie up communication with the server, resulting in longer waits and/or download delays which may increase battery usage by the IoT devices.

Embodiments of the invention may therefore distribute the downloading of a data item that more than one IoT device connected to the same network requires from a remote server among such IoT devices in the network, thereby reducing the number of direct server downloads required and saving battery power.

FIG. 1A is a schematic diagram of a system for collaborative downloading between IoT devices 100 according to some embodiments of the invention. System 100 may include a plurality of n IoT devices 110-1, 110-2, 110-3, . . . , 110-n, where n is an integer. Each IoT device may be, or may include elements of, a computing device such as computing device 300 described with respect to FIG. 3.

The IoT devices may be of the same (or similar) type or may be different. For example, IoT devices 110-1 and 110-2 may be motion sensors, and IoT device 110-3 may be a mobile phone such as a smartphone.

Each IoT device 110-1, 110-2, 110-3, . . . , 110-n may be connected to the same network 101. Network 101 may be a cellular network, a (wired) local area network (LAN), a wireless local area network (WLAN), a wide area network (WAN), and/or a metropolitan area network (MAN). Other network types are possible, however, and it should be understood that embodiments of the invention are not limited to a particular network type.

System 100 may include a server 120. Server 120 may be, or may include elements of, a computing device such as computing device 300 described with respect to FIG. 3.

Server 120 may be configured to communicate with each IoT device of the plurality of IoT devices 110-1, 110-2, 110-3, . . . , 110-n. Server 120 may communicate with the plurality of IoT devices via network 101.

Whilst shown outside of network 101 in FIG. 1A, in some embodiments server 120 is part of network 101. For example, a cellular network usually consumes more power than WiFi, and WiFi usually consumes more power than Bluetooth. Similarly, for transmit power and/or range cellular networks usually have more transmit power/range than WiFi, and WiFi usually has more transmit power/range than Bluetooth. Thus, in some embodiments, if the devices are nearby, then server 120 may communicate with the plurality of IoT devices using Bluetooth, which may save power and prolong a battery life of the IoT devices.

In some embodiments, server 120 is a cloud-based server.

In some embodiments, at least a first IoT device (e.g., IoT device 110-1) of the plurality of IoT devices 110-1, 110-2, 110-3, . . . , 110-n is configured to periodically check (e.g., represented by operation 130-1) the server 120 for an available data item 122 required by the first IoT device.

Data item 122 may be at least one of an update, a firmware image, and/or a policy. In some embodiments, data item 122 is any data item which has a large file size (e.g., greater than a few MBs) and which requires greater bandwidth and time to fetch from server 122 as compared to other data items such as communication packets or pings. In some embodiments, the data item is any data, located remotely on a server, that more than one IoT device typically requires or requests.

The first IoT device 110-1 may perform a network discovery (e.g., represented by operation 150) to determine if any of the other IoT devices of the plurality of IoT devices (e.g., IoT devices 110-2, 110-3, . . . , 110-n) have downloaded the data item. For example, the first IoT device 110-1 may query the other IoT devices on the network to see if they have already downloaded data item 122. Network discovery 150 may include, for example, mDNS-SD (multicast domain name service-service discovery), where an IoT device can discover any services and the details of such services provided by other IoT devices.

The first IoT device may be configured to perform different actions depending on the result of network discovery 150, for example depending on whether or not data item 122 has already been downloaded by another IoT device in network 101.

If one or more other IoT devices (e.g., IoT device 110-2) of the plurality of IoT devices has downloaded (e.g., represented by operation 132-2) the data item 122, the first IoT device may be configured to request (e.g., represented by operation 140-1) the data item from a second IoT device 110-2 of the one or more other IoT devices that downloaded the data item. The first IoT device 110-1 may further be configured to receive (e.g., represented by operation 142-1) the data item from the second IoT device 110-2.

If the network discovery 150 shows that none of the other one or more IoT devices of the plurality of IoT devices 110-2, 110-3, . . . , 110-n have downloaded the data item required by the first IoT device from the server, the first IoT device may be configured to download (e.g., represented by operation 132-1) the data item from the server.

The first IoT device may be further configured to identify to the network that the data item has been downloaded and is offered for service (e.g., represented by operation 160). The first IoT device may make such identification using mDNS-SD, for example.

The first IoT device 110-1 may be further configured to transmit (e.g., represented by operation 142-3) data item 122 to one or more other IoT devices (e.g., IoT device 110-3) of the plurality of IoT devices which request (e.g., represented by operation 140-3) the data item.

It will be understood that some of the IoT devices of the plurality of IoT devices may perform some of the same actions/operations as the at least one first IoT device. For example, in FIG. 1A, both IoT device 110-1 and IoT device 110-2 are shown as periodically checking the server, illustrated by operations 130-1 and 130-2 for IoT devices 110-1 and 110-2, respectively. It should also be understood that some operations have been omitted for the sake of clarity and to avoid overcrowding of the Figures. For example, IoT device 110-3 may also periodically check server 120 for an available data item, but this operation is not shown in FIG. 1A. Similarly, IoT devices 110-2 and 110-3 may both perform network discovery, but these operations are not shown in FIG. 1A.

FIG. 1B is a schematic drawing of a system, showing an example subset of the operations from FIG. 1A, where IoT device 110-1 is the first and only IoT device of network 101 to download data item 122 from server 120. As before, IoT device 110-1 is configured to periodically check (e.g., represented by operation 130-1) server 120 for an available data item 122 required by IoT device 110-1. Server 120 may indicate to IoT device 110-1 that there is indeed an available data item 122 ready for download. IoT device 110-1 may perform a network discovery (e.g., represented by operation 150) to determine if any of the other IoT devices have already downloaded data item 122 from server 120. In the case shown in FIG. 1B, the result of network discovery 150 is that no other IoT devices have downloaded data item 122 from server 120. Accordingly, IoT device 110-1 may download (e.g., represented by operation 132-1) data item 122 from server 120. IoT device 110-1 may then identify (e.g., represented by operation 160) to the network that data item 122 has been downloaded and is offered for service (for example, IoT device 110-1 advertises to network 101 that data item 122 is available locally, rather than from the server). Another IoT device, such as IoT device 110-3, having performed analogous steps of checking with the server and performing network discovery may discover a notice 160 of IoT device 110-1 identifying that IoT device 110-1 has downloaded data item 122 and is offering the data item for service. IoT device 110-3 may request (e.g., represented by operation 140-3) data item 122 from IoT device 110-1. IoT device 110-1, upon receiving request 140-3 from IoT device 110-3 may transmit (e.g., represented by operation 142-3) data item 122 to IoT device 110-3.

In some embodiments, a first IoT device may identify to the network that it has started downloading a data item from the server. Other IoT devices in the same network performing network discovery may be informed by the network that the first IoT device has started downloading the data item. This may discourage other IoT devices from directly downloading data items from the server unnecessarily, and wait to receive the data item from the first IoT device, thereby saving battery power.

Figure 1C:
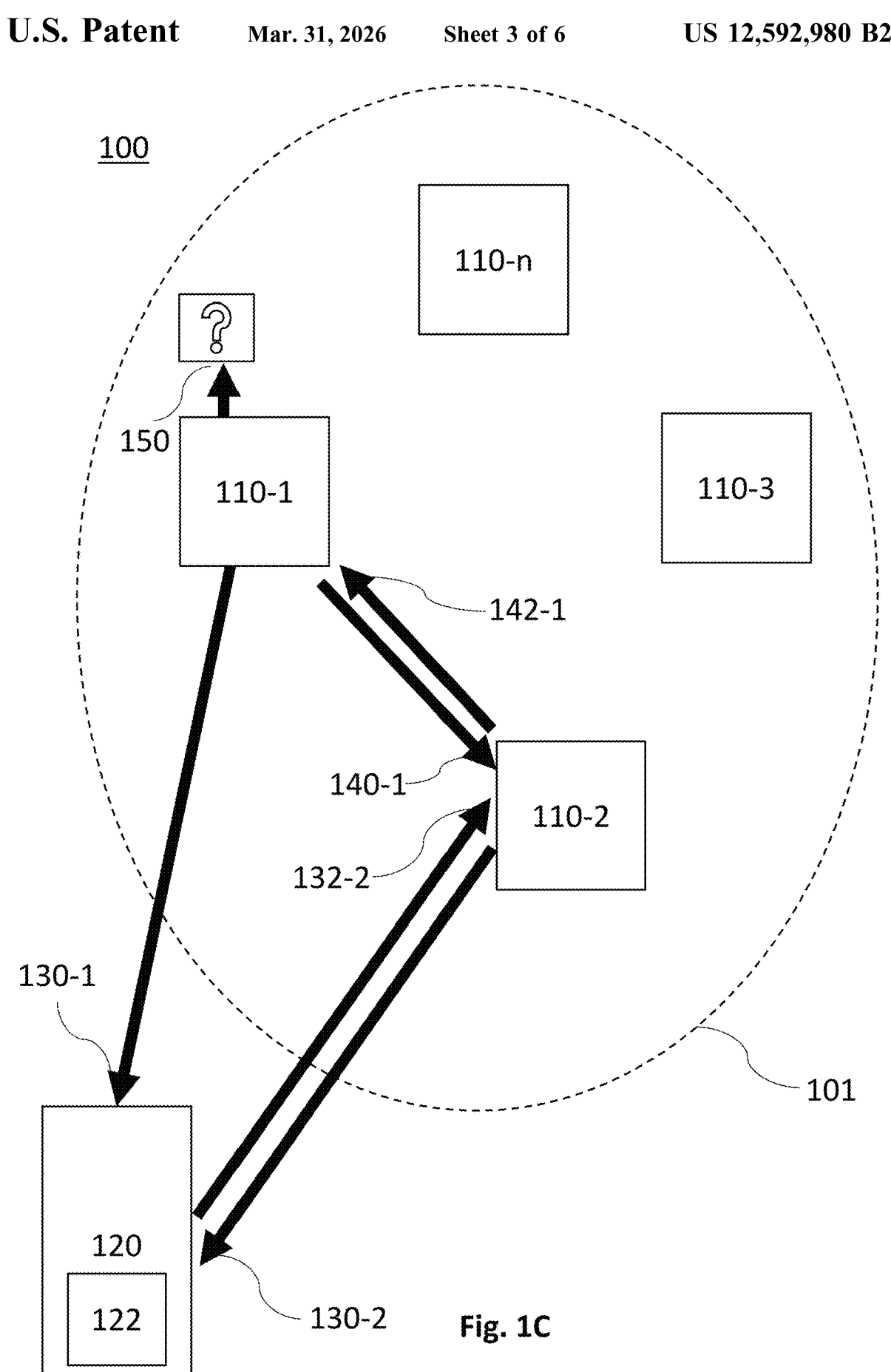
FIG. 1C is a schematic drawing of a system for collaborative downloading between IoT devices, showing an example subset of the operations from FIG. 1A, according to some embodiments of the invention.

FIG. 1C is a schematic drawing of a system, showing an example subset of the operations from FIG. 1A, where IoT device 110-1 is not the first IoT device of network 101 to download data item 122 from server 120 (in this case, IoT device 110-2 is the first IoT device to download or start downloading data item 122). As before, IoT device 110-1 is configured to periodically check (e.g., represented by operation 130-1) server 120 for an available data item 122 required by IoT device 110-1. Server 120 may indicate to IoT device 110-1 that there is indeed an available data item 122 ready for download. IoT device 110-1 may perform a network discovery (e.g., represented by operation 150) to determine if any of the other IoT devices have already downloaded data item 122 or is currently downloading the data item 122 from server 120. In the case shown in FIG. 1C, the result of network discovery 150 is that another IoT device (namely IoT device 110-2) has downloaded or is downloading (e.g., represented by operation 132-2) data item 122 from server 120. Accordingly, IoT device IoT device 110-1 may request (e.g., represented by operation 140-1) data item 122 from IoT device 110-2. IoT device 110-1 may receive (e.g., represented by operation 142-1) data item 122 from IoT device 110-2.

Embodiments of the invention may assign or designate a single so-called "lead" IoT device, responsible for downloading and sharing the data item with the other IoT devices. Assigning a lead device may completely prevent duplicative downloading of the data item from the server by the other IoT devices in the network. A leader may be assigned dynamically, and leadership may change based on, for example, battery life and/or other factors.

In some embodiments, no lead IoT device is assigned. Whilst it may not be optimal to have more than one IoT device in the same network download the data item directly from the server, benefits to battery usage may be seen for even just a single IoT device to receive the data item from another IoT device in the network.

According to some embodiments, the first IoT device is configured to, if the network discovery shows that none of the other one or more IoT devices of the plurality of IoT devices have downloaded or started downloading the data item and a battery level of the first IoT device is below a predefined threshold, defer downloading the data item from the server and wait for a different IoT device of the plurality of IoT devices to download and offer for service the data item. In some embodiments, the IoT device may be configured such that the discovery process is triggered at random intervals or the timing for initiating the discovery process for each IoT device may be staggered, to avoid the same discovery procedure from multiple IoT devices occurring at the same time. This may prevent multiple IoT devices from discovering that no other IoT device in the network has downloaded the data item, which would result in multiple IoT devices downloading the same data item themselves, which may be inefficient. In some embodiments, upon initiating a download procedure for data item 122 (e.g., operation 132-1 in FIG. 1A) the downloading IoT device may indicate to the network (e.g., by way of network discovery) that it has initiated the procedure, which may thereby prevent or dissuade other IoT devices having initiated network discovery for the download service at substantially the same time as the first IoT device from starting their own download direct from server 120.

According to some embodiments, the first IoT device (e.g., IoT device 110-1 in FIGS. 1A and 1B) is configured to, if the first IoT device downloads the data item from the server, only transmit the data item to a trusted IoT device. A trusted IoT device may have the same original equipment manufacturer (OEM) as the first IoT device, and/or have a certificate issued by the same certificate issuing authority as the first IoT device. For example, in the scenario described in FIG. 1B, IoT device 110-1, upon receiving request 140-3 from IoT device 110-3 may only transmit data item 122 to IoT device 110-3 if IoT device 110-3 is a trusted IoT device.

Communication between IoT devices of the plurality of IoT devices may be via trusted secured communication, for example TLS (Transport Layer Security) or SSL (Secure Sockets Layer), with certificate validation.

According to some embodiments, the second IoT device (e.g., IoT device 110-2 in FIGS. 1A and 1C) is a trusted IoT device. Accordingly, in some embodiments, the first IoT device only requests the data item from a trusted IoT device which has downloaded the data item. For example, in the scenario described in FIG. 1C, IoT device 110-1, only sends request 140-1 to IoT device 110-2 if IoT device 110-2 is a trusted IoT device.

According to some embodiments, the network is configured to allow for dynamically adding or removing one or more IoT devices from the network based on at least one of: a battery level; a trust level; and/or an installed update version number. For example, network 101 of system 100 may remove IoT device 110-2 if IoT device 110-2 has a low battery level, thereby preventing other IoT devices from wasting their own battery power communicating with IoT device 110-2. As another example, network 101 may remove IoT device 110-3 if IoT device 110-3 has not installed a most recent update within a predefined time frame, which may indicate that IoT device 110-3 has gone rogue (e.g., hacked by a malicious party).

In some embodiments, if the network discovery shows that none of the other one or more IoT devices of the plurality of IoT devices have downloaded or started downloading the data item, the first IoT device may be configured to download the data item from the server via a first communication protocol, and transmit the data item, via a second, different, communication protocol, to the one or more other IoT device of the plurality of IoT devices which request the data item. For example, in FIG. 1B, IoT device 110-1 may download data item 122 from the server via WiFi, and may transmit data item 122 to IoT device 110-3 via Bluetooth.

FIG. 2 shows a flowchart of a method 200 for collaborative downloading between IoT devices, according to some embodiments of the invention. Method 200 may be implemented by one or more IoT devices in a system such as system 100 shown in FIGS. 1A, 1B, and IC.

Method 200 may include periodically checking, by a first IoT device of a plurality of IoT devices connected to the same network, a server for an available data item required by the first IoT device (Step 201). The server may be in communication with each of the plurality of IoT devices. The plurality of IoT devices may be, for example, IoT devices 110-1, 110-2, 110-3, . . . , 110-*n*, the network may be, for example, network 101, the server may be, for example server 120, and the data item may be, for example, data item 122, as shown in FIGS. 1A-IC. The periodic check of Step 202 may be the same as described for operation 130-1 of FIGS. 1A-IC described above.

The data item may be at least one of an update, a firmware image, and/or a policy. In some embodiments, the data item is any data item which has a large file size (e.g., greater than a few MBs) and which requires greater bandwidth and time to fetch from the server as compared to other data items such as communication packets or pings.

As discussed with respect to network 101, the network of method 200 may be a cellular network, a local area network (LAN), a wireless local area network (WLAN), a wide area network (WAN), a metropolitan area network (MAN), or any other type of network. It should be understood that method 200 is not limited to a particular type of network or network architecture.

Method 200 may include performing network discovery to determine if any other IoT device of the plurality of IoT devices has downloaded or is downloading the data item (Step 202). Discovering as part of step 204 may include network discovery, such as described for operation 150 shown in FIGS. 1A-IC and described above. For example, discovering may include the first IoT device using mDNS-SD.

Method 200 may involve two separate branches of steps depending on if any other IoT device of the plurality of IoT devices are discovered to have downloaded or be in the process of downloading the data item. These branches may include a branch of steps 204, 206, and 208, shown as a left branch of FIG. 2 if there are one or more IoT devices which have downloaded or are downloading the data item, and a branch of steps 203, 205, 207 and 209 shown as a right branch of FIG. 2 if there are no IoT devices which have downloaded nor are downloading the data item.

For the branch where there are one or more IoT devices which have downloaded or are downloading the data item, method 200 may include discovering, by the first IoT device, on the network, one or more other IoT devices of the plurality of IoT devices that have downloaded or started downloading the data item (Step 204).

For the branch where there are one or more IoT devices which have downloaded or are downloading the data item, method 200 may include requesting, by the first IoT device, the data item from a second IoT device of the one or more other discovered IoT devices which have downloaded the data item (Step 206). For example, the first IoT device may send a request such as request 140-1 described above with respect to FIG. 1C.

In some embodiments, method 200 further includes determining, by the first IoT device, before the first IoT device requests the data item from the second IoT device, that that the second IoT device is a trusted IoT device. The first IoT device may determine that the second IoT device is a trusted IoT device by determining that the second IoT device has at least one of: the same original equipment manufacturer (OEM) as the first IoT device; and/or a certificate issued by the same certificate issuing authority as the IoT device requesting the data item.

For the branch where there are one or more IoT devices which have downloaded or are downloading the data item, method 200 may include receiving, by the IoT device, the data item from the second IoT device (Step 208). For example, the first IoT device may receive the data item from the second IoT device as described for operation 142-1 described above with respect to FIG. 1C.

In some embodiments, method 200 includes the first IoT device communicating with the server via a first communication protocol, and wherein the first IoT device receives the data item from the second IoT device via a second, different, communication protocol. For example, the first IoT device may communicate with the server using an internet communications protocol such as WiFi, and may receive the data item from the second IoT device over a cellular communications protocol, such as a cellular network implementing a standard such as GSM (Global System for Mobile communications), or vice versa.

For the branch where there are no IoT devices which downloaded nor are downloading the data item, method 200 may include downloading, by the first IoT device, the data item from the server (Step 203). The downloading may be, for example, as described for operation 132-1 shown in FIGS. 1A-IC.

In some embodiments, for a second data item required by the first IoT device, method 200 includes the first IoT device deferring downloading the second data item from the server and waiting for a different IoT device of the plurality of connected IoT devices to download and advertise the second data item if a battery level of the first IoT device is below a predefined threshold. This may prevent the first IoT device from starting a download from the server that the first IoT device does not have the battery power to complete.

For the branch where there are no IoT devices which have downloaded nor are downloading the data item, method 200 may include advertising, by the first IoT device, on the network, that the first IoT device has downloaded the data item (Step 205). The advertising may be as described for operation 160 shown in FIGS. 1A-1C. In some embodiments, the first IoT device may advertise that it has started downloading the data item before the download is complete, which may allow other IoT devices to wait and request the data item from the first IoT device rather than downloading the data item from the server themselves.

For the branch where there are no IoT devices which have downloaded nor are downloading the data item, method 200 may include receiving, by the first IoT device, a request for the data item from at least one second IoT device of the plurality of connected IoT devices (Step 207). For example, a request for the data item may be as described for operation 140-3 shown in FIG. 1B.

For the branch where there are no IoT devices which have downloaded nor are downloading the data item, method 200 may include transmitting, by the first IoT device, the data item to the at least one second IoT device (Step 209). In some embodiments, the second IoT device has the same original equipment manufacturer (OEM) as the first IoT device, and/or the second IoT device has a certificate issued by the same certificate issuing authority as the first IoT device. For example, the first IoT device may only transmit the data item to a trusted second IoT device.

In some embodiments, method 200 may include the first IoT device downloading the data item from the server via a first communication protocol, and transmitting the data item to at least one other IoT device of the plurality of IoT devices which has requested the data item via a second, different, communication protocol. For example, the first IoT device may download the data item from the server over an internet communications protocol, and may transmit the data item to a requesting IoT device over a cellular communications protocol, such as short message service (SMS).

It should be understood that different IoT devices in a network may implement steps from different branches of method 200, depending on the needs of the IoT devices in the network. It should be understood therefore that some IoT devices may be configured to perform steps of one branch of method 200 (e.g., steps 204, 206, and/or 208), the other branch of method 200 (e.g., steps 203, 205, 207 and/or 209), and/or a combination of both.

For example, in the system shown in FIG. 1B the IoT device 110-1 is performing one or more steps of the right-hand branch shown in FIG. 2 and is the so-called first IoT device from its perspective, whilst IoT device 110-3 is performing one or more steps of the left-hand branch shown in FIG. 2 and is the first IoT device from its perspective. From the perspective of IoT device 110-1 performing steps 203, 205, 207 and/or 209, IoT device 110-3 is a second IoT device, and from the perspective of IoT device 110-3 performing steps 204, 206, and/or 208 it is IoT device 110-1 which is the second IoT device.

As a similar example, in the system shown in FIG. 1C the IoT device 110-2 is performing one or more steps of the right-hand branch of FIG. 2 and is the so-called first IoT device from its perspective, whilst IoT device 110-1 is performing one or more steps of the left-hand branch of FIG. 2 and is the first IoT device from its perspective. From the perspective of IoT device 110-2 performing steps 203, 205, 207 and/or 209, IoT device 110-1 is a second IoT device, and from the perspective of IoT device 110-1 performing steps 204, 206, and/or 208 it is IoT device 110-2 which is the second IoT device.

Figure 3:
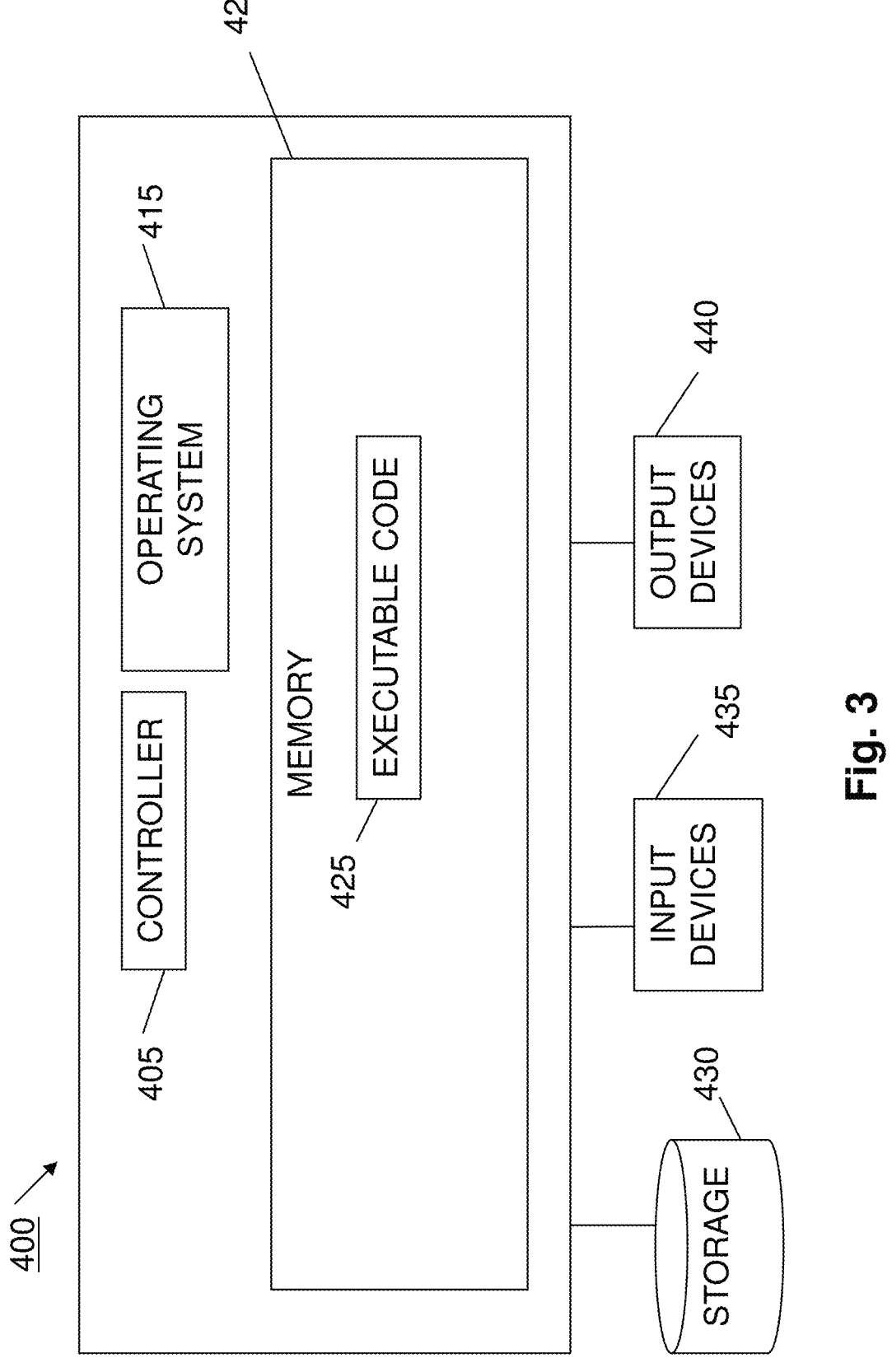
FIG. 3 is a block diagram of an exemplary computing device which may be used with embodiments of the invention.

FIG. 3 is a block diagram of an exemplary computing device 300 which may be used with embodiments of the invention. One or more elements of system 100 as shown in FIGS. 1A-IC, for example IoT devices 110-1, 110-2, 110-3, . . . , 110-n, and/or server 120, may be (or may include elements of) a computing device such as computing device 300.

Computing device 300 may include a controller or computer processor 305 that may be, for example, a central processing unit processor (CPU), a chip or any suitable computing device, an operating system 315, a memory 320, a storage 330, input devices 335 and output devices 340 such as a computer display or monitor displaying for example a computer desktop system.

Operating system 315 may be or may include code to perform tasks involving coordination, scheduling, arbitration, or managing operation of computing device 300, for example, scheduling execution of programs. Memory 320 may be or may include, for example, a Random Access Memory (RAM), a read only memory (ROM), a Flash memory, a volatile or non-volatile memory, or other suitable memory units or storage units. At least a portion of Memory 320 may include data storage housed online on the cloud. Memory 320 may be or may include a plurality of different memory units. Memory 320 may store for example, instructions (e.g., code 425) to carry out a method as disclosed herein. Memory 320 may use a datastore, such as a database.

Executable code 425 may be any application, program, process, task, or script. Executable code 425 may be executed by controller 305 possibly under control of operating system 315. For example, executable code 425 may be, or may execute, one or more applications performing methods as disclosed herein, such as methods for collaborative downloading between IoT devices. In some embodiments, more than one computing device 300 or components of device 300 may be used. One or more processor(s) 305 may be configured to carry out embodiments of the present invention by for example executing software or code.

Storage 330 may be or may include, for example, a hard disk drive, a floppy disk drive, a compact disk (CD) drive, a universal serial bus (USB) device or other suitable removable and/or fixed storage unit. Data described herein may be stored in a storage 330 and may be loaded from storage 330 into a memory 320 where it may be processed by controller 305. Storage 330 may include cloud storage. Storage 330 may include storing data in a database.

Input devices 335 may be or may include a mouse, a keyboard, a touch screen or pad or any suitable input device or combination of devices. Output devices 340 may include one or more displays, speakers and/or any other suitable output devices or combination of output devices. Any applicable input/output (I/O) devices may be connected to computing device 300, for example, a wired or wireless network interface card (NIC), a modem, printer, a universal serial bus (USB) device or external hard drive may be included in input devices 335 and/or output devices 340.

Embodiments of the invention may include one or more article(s) (e.g., memory 320 or storage 330) such as a computer or processor non-transitory readable medium, or a computer or processor non-transitory storage medium, such as for example a memory, a disk drive, or a USB flash memory encoding, including, or storing instructions, e.g., computer-executable instructions, which, when executed by a processor or controller, carry out methods disclosed herein.

One skilled in the art will realize the invention may be embodied in other specific forms without departing from the spirit or essential characteristics thereof. The embodiments described herein are therefore to be considered in all respects illustrative rather than limiting. In detailed description, numerous specific details are set forth in order to provide an understanding of the invention. However, it will be understood by those skilled in the art that the invention can be practiced without these specific details. In other instances, well-known methods, procedures, and components, modules, units and/or circuits have not been described in detail so as not to obscure the invention.

Embodiments may include different combinations of features noted in the described embodiments, and features or elements described with respect to one embodiment or flowchart can be combined with or used with features or elements described with respect to other embodiments.

Although embodiments of the invention are not limited in this regard, discussions utilizing terms such as, for example, "processing," "computing," "calculating," "determining," "establishing", "analyzing", "checking", or the like, can refer to operation(s) and/or process(es) of a computer, or other electronic computing device, that manipulates and/or transforms data represented as physical (e.g., electronic) quantities within the computer's registers and/or memories into other data similarly represented as physical quantities within the computer's registers and/or memories or other information non-transitory storage medium that can store instructions to perform operations and/or processes.

The term set when used herein can include one or more items. Unless explicitly stated, the method embodiments described herein are not constrained to a particular order or sequence. Additionally, some of the described method embodiments or elements thereof can occur or be performed simultaneously, at the same point in time, or concurrently.

The description also includes the subject matter of the following clauses:

Clause 1. A system for collaborative downloading between IoT devices, the system comprising:

a plurality of internet of things (IoT) devices, each IoT device connected to the same network; and a server configured to communicate with each IoT device of the plurality of IoT devices; wherein at least a first IoT device of the plurality of IoT devices is configured to:

periodically check the server for an available data item required by the first IoT device;

perform a network discovery to determine if any of the other IoT devices of the plurality of IoT devices has downloaded or is downloading the data item;

if one or more other IoT devices of the plurality of IoT devices has downloaded the data item:

request the data item from a second IoT device of the one or more other IoT devices that downloaded or are downloading the data item, and receive the data item from the second IoT device; or if the network discovery shows that none of the other one or more IoT devices of the plurality of IoT devices have downloaded or is downloading the data item required by the first IoT device from the server:

download the data item from the server, identify to the network that the data item has been downloaded and is offered for service, and transmit the data item to one or more other IoT devices of the plurality of IoT devices which request the data item.

Clause 2. The system of clause 1, wherein the data item comprises at least one of: an update, a firmware image, or a policy.

Clause 3. The system of any of the preceding clauses, wherein the first IoT device is configured to, if the network discovery shows that none of the other one or more IoT devices of the plurality of IoT devices have downloaded or is downloading the data item and a battery level of the first IoT device is below a predefined threshold, defer downloading the data item from the server and wait for a different IoT device of the plurality of IoT devices to download and offer for service the data item.

Clause 4. The system of any of the preceding clauses, wherein the second IoT device is a trusted IoT device, wherein a trusted IoT device has the same original equipment manufacturer (OEM) as the first IoT device, or has a certificate issued by the same certificate issuing authority as the first IoT device.

Clause 5. The system of any of the preceding clauses, wherein the first IoT device is configured to, if the first IoT device downloads the data item from the server, only transmit the data item to a trusted IoT device, wherein a trusted IoT device has the same original equipment manufacturer (OEM) as the first IoT device, or has a certificate issued by the same certificate issuing authority as the first IoT device.

Clause 6. The system of any of the preceding clauses, wherein the network is configured to allow for dynamically adding or removing one or more IoT devices from the network based on at least one of: a battery level; a trust level; or an installed update version number.

Clause 7. The system of any of the preceding clauses, wherein the first IoT device is configured to, if the network discovery shows that none of the other one or more IoT devices of the plurality of IoT devices have downloaded or is downloading the data item:

download the data item from the server via a first communication protocol, and transmit the data item, via a second, different, communication protocol, to the one or more other IoT device of the plurality of IoT devices which request the data item.

Clause 8. The system of any of the preceding clauses, wherein the network is a cellular network, a wireless local area network (WLAN), a wide area network (WAN), or a metropolitan area network (MAN).

Clause 9. A method for collaborative downloading between IoT devices, the method comprising:

periodically checking, by a first IoT device of a plurality of IoT devices connected to the same network, a server for an available data item required by the first IoT device, wherein the server is in communication with each of the plurality of IoT devices;

discovering, by the first IoT device, on the network, one or more other IoT devices of the plurality of IoT devices that have downloaded or are downloading the data item;

requesting, by the first IoT device, the data item from a second IoT device of the one or more other discovered IoT devices which have downloaded or are downloading the data item; and receiving, by the IoT device, the data item from the second IoT device.

Clause 10. The method of clause 9, wherein the data item comprises at least one of: an update, a firmware image, or a policy.

Clause 11. The method of any of clauses 9-10, further comprising determining, by the first IoT device, before the first IoT device requests the data item from the second IoT device, that that the second IoT device is a trusted IoT device.

Clause 12. The method of clause 11, wherein the first IoT device determines that the second IoT device is a trusted IoT device by determining that the second IoT device has at least one of: the same original equipment manufacturer (OEM) as the first IoT device; and a certificate issued by the same certificate issuing authority as the IoT device requesting the data item.

Clause 13. The method of any of clauses 9-12, wherein the network is a cellular network, a local area network (LAN), a wireless local area network (WLAN), a wide area network (WAN), or a metropolitan area network (MAN).

Clause 14. The method of any of clauses 9-14, wherein the first IoT device communicates with the server via a first communication protocol, and wherein the first IoT device receives the data item from the second IoT device via a second, different, communication protocol.

Clause 15. A method for collaborative downloading between IoT devices, the method comprising:

periodically checking, by a first IoT device of a plurality of IoT devices connected to the same network, a server for an available data item required by the first IoT device, wherein the server is in communication with each of the plurality of IoT devices;

downloading, by the first IoT device, the data item from the server;

advertising, by the first IoT device, on the network, that the first IoT device has downloaded or is downloading the data item;

receiving, by the first IoT device, a request for the data item from at least one second IoT device of the plurality of connected IoT devices; and transmitting, by the first IoT device, the data item to the at least one second IoT device.

Clause 16. The method of clause 15, wherein the data item comprises at least one of: an update, a firmware image, or a policy.

Clause 17. The method of clause 16, wherein, for a second data item required by the first IoT device, the IoT device defers downloading the second data item from the server and waits for a different IoT device of the plurality of connected IoT devices to download and advertise the data item if a battery level of the first IoT device is below a predefined threshold.

Clause 18. The method of any of clauses 15-17, wherein the second IoT device has the same original equipment manufacturer (OEM) as the first IoT device, or the second IoT device has a certificate issued by the same certificate issuing authority as the first IoT device.

Clause 19. The method of any of clauses 15-17, wherein the network is a cellular network, a wireless local area network (WLAN), a wide area network (WAN), or a metropolitan area network (MAN).

Clause 20. The method of any of clauses 15-17, wherein the first IoT device downloads the data item from the server via a first communication protocol, and transmits the data item to at least one other IoT device of the plurality of IoT devices which has requested the data item via a second, different, communication protocol.

What is claimed is:

1. A system for collaborative downloading between IoT devices, the system comprising:

a plurality of internet of things (IoT) devices, each IoT device connected to the same network; and a server configured to communicate with each IoT device of the plurality of IoT devices;

wherein at least a first IoT device of the plurality of IoT devices is configured to:

periodically check the server for an available data item required by the first IoT device;

perform a network discovery to determine if any of the other IoT devices of the plurality of IoT devices has downloaded or is downloading the data item;

if one or more other IoT devices of the plurality of IoT devices has downloaded the data item:

request the data item from a second IoT device of the one or more other IoT devices that downloaded or are downloading the data item, and receive the data item from the second IoT device; or if the network discovery shows that none of the one or more other IoT devices of the plurality of IoT devices have downloaded or that none of the one or more other IoT devices of the plurality of IoT devices is downloading the data item required by the first IoT device from the server:

download the data item from the server, identify to the network that the data item has been downloaded and is offered for service, and transmit the data item to one or more other IoT devices of the plurality of IoT devices which request the data item.

2. The system of claim 1, wherein the data item comprises at least one of: an update, a firmware image, or a policy.

3. The system of claim 1, wherein the first IoT device is configured to, if the network discovery shows that none of the one or more other IoT devices of the plurality of IoT devices have downloaded or that none of the one or more other IoT devices of the plurality of IoT devices is downloading the data item and a battery level of the first IoT device is below a predefined threshold, defer downloading the data item from the server and wait for a different IoT device of the plurality of IoT devices to download and offer for service the data item.

4. The system of claim 1, wherein the second IoT device is a trusted IoT device, wherein a trusted IoT device has the same original equipment manufacturer (OEM) as the first IoT device, or has a certificate issued by the same certificate issuing authority as the first IoT device.

5. The system of claim 1, wherein the first IoT device is configured to, if the first IoT device downloads the data item from the server, only transmit the data item to a trusted IoT device, wherein a trusted IoT device has the same original equipment manufacturer (OEM) as the first IoT device, or has a certificate issued by the same certificate issuing authority as the first IoT device.

6. The system of claim 1, wherein the network is configured to allow for dynamically adding or removing one or more IoT devices from the network based on at least one of: a battery level; a trust level; or an installed update version number.

7. The system of claim 1, wherein the first IoT device is configured to, if the network discovery shows that none of the one or more other IoT devices of the plurality of IoT devices have downloaded or that none of the one or more other IoT devices of the plurality of IoT devices is downloading the data item:

download the data item from the server via a first communication protocol, and transmit the data item, via a second, different, communication protocol, to the one or more other IoT device of the plurality of IoT devices which request the data item.

8. The system of claim 1, wherein the network is a cellular network, a wireless local area network (WLAN), a wide area network (WAN), or a metropolitan area network (MAN).

9. A method for collaborative downloading between IoT devices, the method comprising:

periodically checking, by a first IoT device of a plurality of IoT devices connected to the same network, a server for an available data item required by the first IoT device, wherein the server is in communication with each of the plurality of IoT devices;

discovering, by the first IoT device, on the network, one or more other IoT devices of the plurality of IoT devices that have downloaded or are downloading the data item;

requesting, by the first IoT device, the data item from a second IoT device of the one or more other discovered IoT devices which have downloaded or are downloading the data item; and receiving, by the IoT device, the data item from the second IoT device.

10. The method of claim 9, wherein the data item comprises at least one of: an update, a firmware image, or a policy.

11. The method of claim 9, further comprising determining, by the first IoT device, before the first IoT device requests the data item from the second IoT device, that that the second IoT device is a trusted IoT device.

12. The method of claim 11, wherein the first IoT device determines that the second IoT device is a trusted IoT device by determining that the second IoT device has at least one of: the same original equipment manufacturer (OEM) as the first IoT device; and a certificate issued by the same certificate issuing authority as the IoT device requesting the data item.

13. The method of claim 9, wherein the network is a cellular network, a local area network (LAN), a wireless local area network (WLAN), a wide area network (WAN), or a metropolitan area network (MAN).

14. The method of claim 9, wherein the first IoT device communicates with the server via a first communication protocol, and wherein the first IoT device receives the data item from the second IoT device via a second, different, communication protocol.

15. A method for collaborative downloading between IoT devices, the method comprising:

periodically checking, by a first IoT device of a plurality of IoT devices connected to the same network, a server for an available data item required by the first IoT device, wherein the server is in communication with each of the plurality of IoT devices;

downloading, by the first IoT device, the data item from the server;

advertising, by the first IoT device, on the network, that the first IoT device has downloaded or is downloading the data item;

receiving, by the first IoT device, a request for the data item from at least one second IoT device of the plurality of connected IoT devices; and transmitting, by the first IoT device, the data item to the at least one second IoT device.

16. The method of claim 15, wherein the data item comprises at least one of: an update, a firmware image, or a policy.

17. The method of claim 16, wherein, for a second data item required by the first IoT device, the IoT device defers downloading the second data item from the server and waits for a different IoT device of the plurality of connected IoT devices to download and advertise the data item if a battery level of the first IoT device is below a predefined threshold.

18. The method of claim 15, wherein the second IoT device has the same original equipment manufacturer (OEM) as the first IoT device, or the second IoT device has a certificate issued by the same certificate issuing authority as the first IoT device.

19. The method of claim 15, wherein the network is a cellular network, a wireless local area network (WLAN), a wide area network (WAN), or a metropolitan area network (MAN).

20. The method of claim 15, wherein the first IoT device downloads the data item from the server via a first communication protocol, and transmits the data item to at least one other IoT device of the plurality of IoT devices which has requested the data item via a second, different, communication protocol.

\* \* \* \* \*